United States Patent [19]

Howard et al.

[11] 4,239,954
[45] Dec. 16, 1980

[54] BACKER FOR ELECTRON BEAM HOLE DRILLING

[75] Inventors: Curtiss G. Howard, Manchester, Conn.; Lester W. Jordan, Cranston, R.I.; Chester E. Yaworsky, Glastonbury, Conn.

[73] Assignee: United Technologies Corporation, Hartford, Conn.

[21] Appl. No.: 968,594

[22] Filed: Dec. 11, 1978

Related U.S. Application Data

[63] Continuation-in-part of Ser. No. 861,776, Dec. 19, 1977, abandoned.

[51] Int. Cl.³ .............................................. B23K 27/00
[52] U.S. Cl. .............................................. 219/121 EH
[58] Field of Search ..... 219/121 L, 121 LM, 121 EB, 219/121 EM; 106/38.3; 260/42.51

[56] References Cited

U.S. PATENT DOCUMENTS

| | | | |
|---|---|---|---|
| 3,410,979 | 11/1968 | Larsson | 219/121 LM |
| 3,473,599 | 10/1969 | Rose | 106/38.3 X |
| 3,649,806 | 3/1972 | Konig | 219/121 EM |
| 3,683,995 | 8/1972 | Zifferer | 106/38.3 X |
| 3,738,957 | 6/1973 | Iler | 260/42.51 |
| 3,773,776 | 11/1973 | Iler | 260/42.51 X |
| 3,802,902 | 4/1974 | Turner et al. | 106/38.3 |
| 3,892,579 | 7/1975 | Mabie, Jr. | 106/38.3 |

*Primary Examiner*—C. L. Albritton
*Attorney, Agent, or Firm*—Charles G. Nessler

[57] ABSTRACT

Disclosed is an electron beam hole drilling process in which the workpiece surface where the hole exits is covered with a backer comprising particulate bonded to itself and the exit surface by a binding agent. The backer enables a hole having substantial uniform symmetry along its length to be drilled and is particularly useful for hollow parts and contoured surfaces. Backers removable by liquifying, melting dissolution, leaching and the like, are particularly useful for inaccessible exit surfaces. In a preferred embodiment the backer is comprised of a nonmetallic particulate such as glass while the binder is a soluble silicate.

12 Claims, 2 Drawing Figures

BACKER FOR ELECTRON BEAM HOLE DRILLING

This is a continuation in part of our application Ser. No. 861,776, filed Dec. 19, 1977, and now abandoned.

BACKGROUND OF THE INVENTION

1. Field of the Invention

The present invention relates to machining and, more particularly, to drilling holes, slots and other passageways through a workpiece by electron beam and other energy beam techniques.

2. Description of the Prior Art

The use of electron beam energy to drill one or more holes in a metallic or nonmetallic workpiece has only recently been investigated. It has been discovered from experimental electron beam drilling tests that in order to produce a hole symmetrical along its length through the workpiece, the electron beam must have a certain amount of excess energy, that is, more energy than merely required to achieve penetration through the workpiece. If this excess beam energy is not provided, a hole of nonsymmetrical cross-section, or tapered shape, or both will be produced. As a result of the requirement for excess electron beam energy, a material, or so-called backer, is required at the surface of the workpiece facing away from the beam, that is, the surface which will be last penetrated by the beam as it progresses through the workpiece. Hereafter this surface is referred to as the exit surface. The purpose of the backer material is to both absorb or dissipate the excess electron beam energy as the beam penetrates the exit surface and to generate sufficient gaseous pressure by the local action of the beam to expel the molten workpiece material from the hole being drilled. The molten material is typically expelled in the direction opposite to the propagation of the beam, that is, from the entrance of the hole at the first penetrated surface, or entrance surface, of the workpiece. When the expulsion is insufficient a burr will be formed around the entrance to the hole. This is often coupled with a "recast" layer, or a portion of melted and solidified metal within the hole.

Backers of metals, such as brass or zinc, have been used in the development of electron beam drilling. These are usable when they have higher vapor pressure than the workpiece, such as is true with steel. Metallic backers have also been used in combination with volatilizing films, which supply the gaseous medium to expel the molten metal from the drilled hole in the workpiece, as described in Konig U.S. Pat. No. 3,649,806. However, many workpieces used in high performance situations are made of materials sensitive to contamination. Here the use of metallic backers will disadvantageously lower material properties because of alloying at the hole location. This happens, for instance, when zinc backers are used in combination with high temperature and fatigue resisting nickel alloys. Premature failure will occur at the holes due to contamination. Other backer materials can similarly cause degradation by lowering properties or inducing corrosion in service.

Combinations of metal powders, and various organic matrices have also been used heretofore. The use of backers containing metal powder has the potential contamination disadvantage previously mentioned for metallic films. In addition particulate residue left in the interior of a hollow drilled component can react with the component on heating during service with adverse result. With metal powders the organic binders used heretofore have generally comprised materials such as silicon rubber and epoxies. These have been removed only by mechanical means or combustion, inasmuch as they are not conveniently solube in commercial solvents which will not also attack the workpiece.

Preformed metal and ceramic cellular structures containing volatile materials have also been used, as described in Konig, supra. However, these have the disadvantage, as do metallic sheets to a lesser degree, that they cannot be made to closely conform to irregular surfaces, and are generally unsuitable for placement in, or removal from, complexly shaped interior cavities. When close contact with the workpiece is not maintained backers function inferiorly and further, an undesirable burr may be formed at the exit surface.

Backers, as mentioned, are used in order to improve the dimensional quality of the hole being drilled. But heretofore there has been little more than general knowledge on the specific correlation between the physical characteristics of the backer material and the character of the drilled hole. Therefore, the artisan is not instructed by the prior art on selection of a backer material to overcome problems with particular hole configurations or workpiece materials. For example, perpendicular holes can be drilled in certain nickel base alloys, using prior art backer materials or structures. However, using the same materials, irregular and undesired shapes occur when drilling oblique holes in other cast nickel base superalloys. As a further example, the energy to be absorbed and the effects to be accommodated by the backer are considerably greater for deeper holes than shallow holes. Consequently some backers work well in the second instance but poorly in the first.

SUMMARY OF THE INVENTION

An object of the invention is to provide improved backers and methods for energy beam drilling, most particularly, electron beam drilling, to improve hole quality.

In accord with the invention, particulate and binder combination backers are applied to workpieces prior to drilling. The backers are at least partially liquifiable by dissolution, melting, leaching, and the like. After drilling they are removed by conversion to a liquid state, whereupon they can be reconstituted and reused as desired. In one embodiment the binder is a thermoplastic polymer such as polyvinyl alcohol or wax; in another, useful for deeper holes, the binder is a silicate, such as sodium silicate. In certain embodiments the particulate is a ceramic such as alumina, zirconia, silica, and the like, or a glass. Particulate fraction compared to binder fraction can be varied; typically the particulate is 50–90 percent of the backer, by weight.

According to the invention, a backer is provided by mixing particulate with the binding agent and placing the combination in intimate proximity to the exit side of the workpiece. Typically, upon application or formation, the backer is in a heated state or contains a volatile liquid diluent and is converted into useful form by cooling or drying, as the case may be. The backer may be formed in situ or separately, with respect to the workpiece. When formed in situ it is the action of the binding agent which preferably adheres the backer to the workpiece.

The invention provides the characteristics required of a commercially mass production backer material which are: (a) low in cost; (b) easily applied to complex shapes; (c) maintaining intimate contact with the workpiece surface; (d) easily removable from the workpiece after drilling; (e) readily absorbing or dissipating the excess beam energy; (f) expulsing of molten workpiece material from the hole being drilled; (g) producing a metallurgically acceptable recast structure in the hole; (h) not detrimental to an electron beam gun life; (i) minimizing the burr around the perimeter of the hole in the last penetrated surface; and (j) innocuous to the metallurgical or other properties and structure of the workpiece.

The present invention further provides a method useful for energy beam drilling one or more holes, including slots, passageways and the like, having substantial uniform symmetry along their lengths through a workpiece wall. Although especially useful in producing symmetrical holes of substantially constant diameter through the workpiece wall, the invention also finds use in producing symmetrical tapered holes through the workpiece and in reducing burr formation on the entrance and exit surfaces.

DESCRIPTION OF PREFERRED EMBODIMENTS

Figure 1:
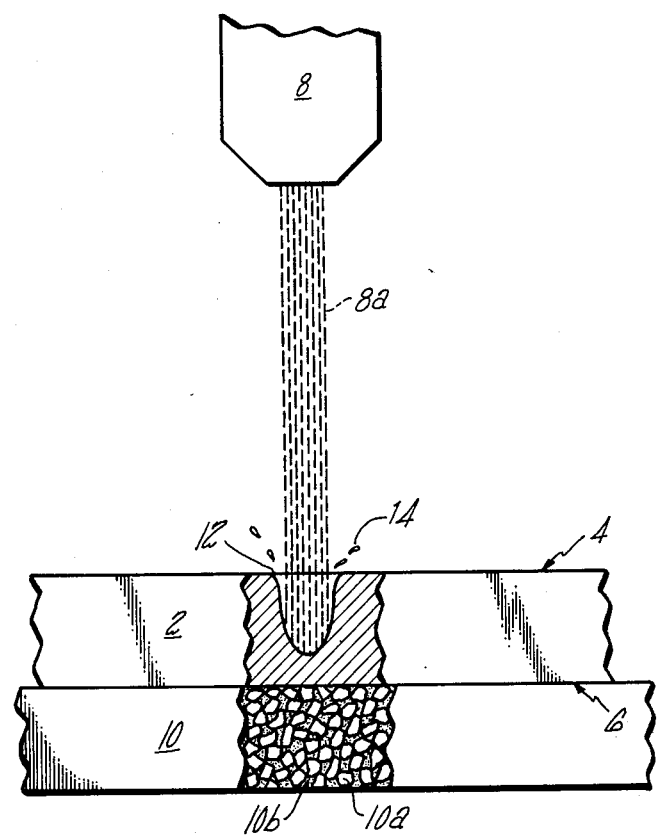
FIG. 1 shows schematically an arrangement for carrying out the process of the invention on a workpiece wall having the backer layer applied thereto.
Figure 2:
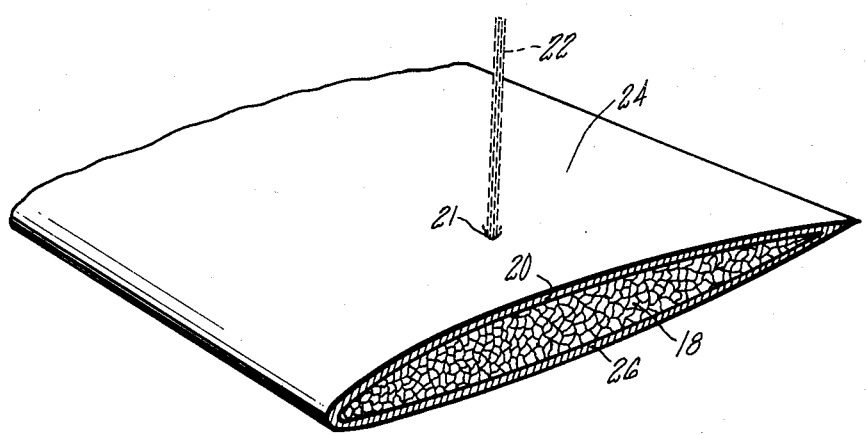
FIG. 2 shows in cross section the drilling of a hollow gas turbine airfoil having its cavity filled with a backer.

The Figure illustrates schematically a typical arrangement for carrying out the drilling process of the present invention. Shown is a workpiece wall 2 to be drilled, the wall having an entrance surface 4 and an exit surface 6, the entrance surface facing toward electron gun 8 which generates a beam 8a of electrons and directs and propagates the beam onto the entrance surface. Shown as a layer on the exit surface is the backer 10 for absorbing the excess energy from the beam as it penetrates the surface and for generating sufficient gaseous pressure under the local action of the beam, to expel molten workpiece material 14 from the entrance to the hole 12 in surface 4 in a direction opposite to beam propagation.

According to the invention, the backer comprises particulates 10a bonded together and to the surface 6 by a binding agent 10b. Many types of particulate or particle are suitable for use in the backer layer. Typical, nonlimiting examples are metals alloys, fine glass beads, glass frit, fused silica particles and alumina, calcia, magnesia, silica and zirconia powder. The amount of particulate can be varied to achieve particular purposes in conjunction with the type of binding agent utilized and depth of hole to be drilled as discussed hereafter. The particles function in the method of the invention to absorb a large part of the excess electron beam energy as the beam penetrates the exit surface 6.

Organic Binders

The binding agent utilized in the backer layer will depend to some extent upon the depth of hole to be drilled. For shallow holes, that is, holes of a depth less than 0.1 inch, a binding agent of thermoplastic polymer is preferred. Various types of thermoplastic polymers are usable in the backer layer including, but not limited to, elastomers, resins and waxes as well as natural and synthetic polymers. Preferred thermoplastic polymer binders are polyvinyl chloride, polyethylene glycol, polyvinyl alcohol and wax. Although not preferred, thermosetting polymers may find use in the backer layer in some situations. The softening and melting temperatures of the polymer utilized must be sufficiently high that, during drilling, the excess energy absorbed by the binder does not generally, or on a large scale, excessively soften or melt it, thereby causing loss of adhesion, or delamination, of the backer layer. Of course, that portion of the backer being locally impinged by the electron beam will be melted and vaporized. After hole drilling is completed, the backer layer will be removed from surface 6 of the workpiece. To this end, the polymer binder must impart removability to the backer layer, for example, by heating, dissolution, peeling and the like.

Particularly preferred polymer binders for use in fabricating a flexible backer layer are a flexible proprietary wax known as Cerita 1003 Dipping Wax manufactured by Argueso Corporation of Mamaroneck, N.Y., and a plasticized polyvinyl chloride polymer. On the other hand, a semi-rigid backer layer can be preferably formed from a thermoplastic resin known as WINF also manufactured by Argueso Corporation.

With respect to the importance of softening or melting temperature in the selection of the binder, we have discovered that when drilling structures with high hole densities the WINF is preferred to the Cerita 1003 wax, since the latter is sonner subject to general softening and melting from heat accumulated during the repetitive drilling.

A convenient technique for providing the polymer-bonded backer layer on the exit surface is to mix the particulate in the polymer in the liquid state and then apply the mixture to the surface, in a slurry form by troweling, brushing, spraying, injection, or like processes, and subsequent, hardening into a solid backer layer. Having done this, the binder will be intimately in contact and adherent with a clean workpiece surface. (Of course adherence can intentionally be prevented by an atypically dirty workpiece or by the presence of a non-receptive film on the workpiece.)

The most preferred embodiment of in situ backer formation set out herein encompasses adherence of the backer to the workpiece, but it is not necessary that this adherence be achieved to be within the scope of the invention. We have found that it is necessary to achieve a fair degree of gas pressure seal between the backer and the workpiece so that the vaporized or gasified backer constituents are forced through the drilled hole rather than relieved through either a permeable backer or along a space between the workpiece and the backer. As a following illustration sets out, this can be accomplished by use of a separately formed backer of sufficient compliance to accommodate irregularities on the workpiece surface, in combination with a means for pressing the workpiece and the backer together. As a further option, a separately formed backer may be joined to a workpiece by use of a film of adhesive similar in nature to the binder.

The necessary thickness of the backer will vary with the binder and particulate, the thickness of the workpiece being drilled, and the beam characteristics. We have found that thicknesses of 1.54 to 6.35 mm (0.060 to 0.250 inch) are satisfactory, with the greater thicknesses being associated with lesser percentage particulate, thicker workpieces, and higher beam intensities.

Flexible binder materials are especially important when flexible workpieces in the form of strip, sheet and the like are to be manipulated onto a cylindrical drum-shaped fixture for drilling. In this situation, a billet of the flexible binder material, along with particles dispersed therein, is extruded to sheet form. The flexible backer sheet is then placed on the exit surface of a flexible flat metal workpiece strip and the couple is thereafter wrapped around a drum fixture, the free surface of the backer sheet being in contact with the drum. The assembly is then placed in an electron beam machine and drilled. After hole drilling, the used backer layer is conveniently peeled, stripped or dissolved from the metal workpiece. Then according to the advantage provided by the invention, the backer material can be readily reconstituted into additional backer material for further like use.

A preferred method of backer removal is by converting the backer to a liquid state, at least in part. As used herein, liquid refers to a state in which the backer behaves essentially as a liquid, but of course, it is to be understood that neither the particulate nor all the binder need be a liquid to accomplish the purposes of the invention. When the backer is converted to a form in which it behaves as a liquid it will be freely removable from the workpiece by the action of gravity or other flow-inducing means.

Of the aforementioned polymer backer materials we have found that heating the WINF or Cerita 1003 materials to the range of 175°-300° F. is sufficient to cause these backers to flow freely from the workpiece. Removal is readily accomplished by immersion in hot water, from which the immiscible molten polymers and contained particulate may be easily retrieved by skimming or cooling and soldification. Other convection, conduction, and radiation heating removal means will be evident. Examples are furnace heating and microwave radiation. Alternately a solvent can be used to cause the binder to dissolve. The particulate of the backer will become suspended or settled in the solute. Removal of the solute, as by distillation, will restore the backer to its original form. Examples of this are dissolution of polyvinyl alcohol in water or a paraffin base wax in trichloroethylene. A vapor degreasing procedure is convenient in the latter example. Also, backers can be disintegrated to the liquid state by action of an acid or alkali. All these dissolution processes can be characterized as leaching.

Inorganic Binders

For drilling deep holes e.g., greater than 0.1 inches, particularly in wrought nickel alloys, the backer preferably contains an inorganic binding agent with or without a vaporizable liquid diluent. The inorganic binding agents function in the same way as previously mentioned for the organic agents, that is, they both bind the particulate to itself to form the backer, and when formed in situ, the backer to the workpiece exit surface. It is unnecessary to fire the inorganic binder backer layers at very high temperatures to achieve a usable backer or get adhesion to the workpiece, when using suitable binding agents such as sodium-silicate, -aluminate, or -phosphate, and the like. These are mixed with particulate in company with a water diluent, typically. The aforementioned sodium-silicate typifies an inorganic polymer. Other solvent soluble compounds will present themselves to the knowledgeable user. It is of course required that the inorganic binder not react adversely with the particulate upon mixing, nor with the workpiece during hole drilling. Further the binder should permit removal by liquification of the backer. Inorganic binder-containing backers are applied in a similar manner to that described for the polymer binder backers.

The binding agent is added in amounts required to achieve intimate bonding of the particles together and to the workpiece surface. For example, in a mixture of sodium-silicate liquid binder and ceramic particulate, such as alumina or zirconia, the sodium-silicate will be present in amounts from about 25 to 40 weight percent of the as-mixed slurry. Sodium-silicate is a preferred binding agent since a backer layer incorporating this binder can be readily removed from the last penetrated surface after drilling by dissolution in hot water. Backer layers utilizing other binding agents, for example colloidal silica, can be readily removed by dissolution in appropriate acids or alkalies, which of course will be materials having a pH substantially variant from 7 and which must be chosen for their lack of adverse effect on the workpiece. All the aforementioned dissolutions can be characterized as leaching.

The liquid diluent which may be used in preparation of the slurry or slip can be any compatible diluent including water or organic liquids or mixtures thereof. The main requirement of the volatile diluent is that it be reasonably safe to use, inexpensive and sufficiently liquid at ordinary temperatures to act as a dispersant for the particulate so that the slurry can be suitably coated onto the workpiece surface, and at the same time be sufficiently volatile to evaporate when exposed to atmospheric or oven drying. Of course, the type or amount of liquid diluent used to prepare the slurry or slip can be adjusted to suit the particular application technique, such as brushing, troweling, spraying, dipping or other appropriate means, for spreading the slurry layer on the exit surface. In the case of a hollow part or one having inaccessible exit surface, the backer material may be applied by pouring, ramming, injection molding, or the like. Other methods for applying the slurry to the workpiece surface will readily suggest themselves to persons skilled in the art. And backers can be separately formed as previously described.

As mentioned hereinabove, the backer layer may be separately formed, or applied to the exit surface as a solid film, for example, an extruded film, or as a liquid or slurry coating to subsequently solidify in situ. The thickness of the backer layer of course will vary with the depth of hole being produced and with the energy of impinging electron beam. For holes of a depth less than 0.1 inch, thickness in the range from about 0.060 to 0.125 inch has been found satisfactory. For deeper holes, thicknesses on the order of 0.060 to 0.250 inch are used. Of course, the thickness required will depend upon the type and amount of particulate used, the type of binder used as well as beam energy required to produce a given hole in a particular workpiece.

The amount of particulate can be varied to achieve the desired energy absorbing and vaporization capability. With an inorganic binder such as sodium-silicate, a particulate such as alumina, zirconia, or glass may be present in amounts from about 60 to 75 weight percent of as-mixed slurry.

Particulates

The backer layers of the invention find special use in drilling one or more holes in hollow parts or multiple wall parts where, after the beam penetrates one wall, it may continue on to undesirably strike the other opposite wall. In such cases, the backer will have suitable character to resist penetration, the requisite degree determined by the space to be filled.

Many different compositions of particulates may be used. As mentioned, metal powders are to be avoided because of potentially alloying with the workpiece, but they are entirely suitable for noncritical applications. Ceramic particulates such as alumina, zirconia, and silica, have been found to be especially suitable compared to metals. Glass particulates have also been found particularly useful. The particulate character and size is chosen according to commercial availability, the requirements for adequate viscosity in the liquid slurry being used to form the backer, and the particular material. Round and irregular grain shapes are usable without particular distinction. Particulates which are less than 175 microns have been most used, while some as fine as 5 micron average particle size are usable. Of course, it is well known the percentage of particulate weight which can be included with a binder in a dense structure is dependent on the particle size distribution, but we have not evaluated this aspect specifically.

Although the invention has been illustrated in the Figure as useful for drilling a hole whose longitudinal axis is normal to the workpiece surfaces, it will be appreciated that one or more holes whose longitudinal axes are inclined relative to the workpiece surfaces can also be produced. Such holes of course must pass through a greater effective thickness of material. In addition the acute angle formed by the intersecting hole and the exit surface creates an unusual circumstance which apparently makes such holes more difficult to perfect. To date, the backers of the present invention, especially those comprising ceramic particulate bonded together and to the workpiece surface by a binding agent such as sodium-silicate or WINF have been found suitable for drilling such included holes with substantial uniform symmetry through a nickel or cobalt base alloy workpiece wall where the hole depth is greater than 0.1 inch.

EXAMPLES

The binder and particulate combinations mentioned above, and many more of like nature, have been evaluated. As a further description of the use of the invention, the following is illustrative.

A Stiegerwald Electron Beam Hole Driller Model G-10P-K6 is used with acceleration voltage of 120 kilovolts, a beam current of 50 milliamperes, and a single pulse duration of 1 millisecond, to drill a 0.025 inch diameter hole in a 0.022 inch thick sheet of AMS 5544 Waspaloy wrought nickel alloy sheet.

In one example, a flat sheet about 48 by 3 inches is to be drilled. Prior to assembly for drilling, 100 parts by weight Cerita 1003 wax are heated to about 140° F. and 110 parts by weight soda lime glass particulate of nominal $-175$ micron size is stirred in while the viscosity is controlled by temperature to get an even suspension. The mixture is cooled to form a billet which is thereafter extruded through a 95° F. rectangular die into room air to form a backer sheet 0.062 inch thick with a nominal length similar to that of the metal sheet to be drilled. The backer is wrapped firmly around an aluminum drum drilling fixture and the metal sheet is then wrapped upon the backer and securely tensioned to get intimate contact. The assembly is placed in the Hole Driller and the desired number of holes are drilled. After removal from the machine, the tensioners are released and the sheet metal is removed from the drum. Usually the backer is lightly adhered to the sheet metal and it is removed by peeling; in the alternative, scrapping with a utensile removes it. The backer material is then remelted into billet for further extrusion and reuse.

In another example, the metal to be drilled is in the form of a tube closed at one end. A WINF thermoplastic polymer at 250°-275° F. is mixed with a quantity of $-175$ micron soda lime glass in a proportion which produces 60 weight percent glass. The powder is stirred into the liquid WINF and the resultant mixture is pressure injected into the tube which has been heated to 300° F. Thereafter vacuum may be used to ensure the removal of entrapped air. The backer material is allowed to cool in air, to solidify at least its surface, and the tube is then plunged in cool water to hasten cooling. After drilling, the tube is heated to 300° F. in air to cause the backer to flow from the tube to a collector for reuse. Backer residue remaining in the tube is removed by means of a vapor degreaser containing perchloroethylene, augmented by liquid phase flushing.

Another more specific example of the foregoing is the drilling of a hollow gas turbine airfoil. The interior cavity is filled with a backer having an inorganic nonmetallic particulate bonded with a polymer, such as the glass and wax combination previously mentioned. Inasmuch as the interior is filled, the backer is intimately in contact with the interior cavity surface. Thus, a hole may be drilled at any point about the airfoil by impinging a beam on the exterior surface. When the beam penetrates through the airfoil into the backer vapor pressure from the binder is generated, thereby expelling molten airfoil material from the hole entrance surface on the airfoil exterior. Excess energy is absorbed by the backer filling the cavity and the beam is thereby prevented from striking and damaging the opposing wall of the airfoil. Accordingly, in like fashion a multiplicity of holes may be drilled in a hollow airfoil to make a well-known transpiration cooled gas turbine part.

In another example, a nickel superalloy casting is drilled using analogous drilling parameters to those for the sheet, taking into account any thickness difference.

Before drilling, a backer having a polyvinyl alcohol binder is formed in place. A slightly hydrolyzed polyvinyl alcohol powder of commercial quality is mixed with 9 parts cold water. The mixture is heated to about 190° F. to fully dissolve the powder. To this is added 150-175 micron particulate soda lime glass in a quantity sufficient to bring the weight of particulate in the slurry to 70 percent. The resultant slurry is then placed on the exit side of the workpiece by troweling, to a thickness of about 0.2 inch, and allowed to air dry.

In another example, the backer has a sodium-silicate binder, to which is added a quantity of minus 175 micron soda lime glass powder to form a slurry, in which the weight of powder represents about 60 percent. The slurry is then poured about the workpiece and allowed to air dry.

After drilling in both instances, the workpiece is placed in hot water at 190° F. and the binder dissolves and the particulate falls free, and the backer is removed.

Those skilled in the art will also recognize that the backers of the invention may also be used in other machining processes which utilize a beam of energy to effect removal of material through the workpiece, for example, laser or ion drilling. They also will recognize that the invention herein is applicable to drilling of other materials than the metals used to illustrate the preferred embodiment. Likewise, they will recognize that under special circumstances material of the backer composition can be applied to the entrance surface of the workpiece to avoid adherent spatter and other burrs, in a manner similar to that described in our U.S. Pat. No. 4,156,807. Other changes, additions and omissions may be made to the preferred embodiments without departing from the spirit and scope of the invention.

Having thus described a typical embodiment of our invention, that which we claim as new and desire to secure by Letters Patent of the United States is:

1. A method for drilling a hole with an energy beam, such as an electron beam, through a workpiece having an entrance surface toward which the beam propagates and through which it first penetrates, and an exit surface which the beam last penetrates, comprising:
   (a) intimately contacting a backer with the exit surface, the backer being characterized by a particulate bonded together with a binder, the particulate and binder having properties which avoid forming reaction products deleterious to the workpiece during hole drilling and the backer being further characterized by being adapted to removal, at least in part, as a liquid after drilling;
   (b) directing an energy beam onto a portion of the entrance surface with an intensity sufficient to produce a hole in the workpiece, penetrate the exit surface, and generate within the backer gaseous products sufficient to expel molten workpiece material from the hole at the entrance surface in a direction opposite to the beam propagation; and
   (c) removing the backer by converting it to at least a partial liquid state with a means which does not adversely affect the workpiece.

2. The method of claim 1 comprising the additional step of applying the backer to the workpiece as an adherent coating.

3. The methods of claims 1 or 2 where the backer is further characterized by being meltable and the removal means is heating.

4. The methods of claims 1 or 2 where the backer is further characterized by being leachable from the workpiece surface as a liquid.

5. The method of claims 1 or 2 where the particulate is an inorganic nonmetallic and the binder is a polymer liquifiable at a temperature less than about 300° F. (150° C.)

6. The method for drilling a hole with an electron beam in a hollow gas turbine airfoil article having a beam entrance surface defining the exterior of the article, toward which the beam propagates and through which it first penetrates, and an interior surface defining a cavity, into which the beam last penetrates, comprising:
   filling the interior cavity with a backer, the backer being characterized by an inorganic nonmetallic particulate bonded to itself and to the interior surface with a polymeric binder, the materials and quantities being chosen to prevent beam penetration and contain the gas pressure generated therewithin by the action of an energy beam;
   directing an energy beam onto a portion of the entrance surface of the article with an intensity sufficient to produce a hole in the wall of the article and to additionally penetrate the backer;
   generating sufficient vapor pressure under the action of the beam on the backer to expel molten workpiece material from the hole at the entrance surface, in a direction opposite to the beam propagation;
   preventing the beam from striking the wall opposing the wall being drilled, by absorption of excess energy in the backer; and
   removing the backer by converting it at least in part to a liquid, using a means which does not adversely affect the article, such means being chosen from either melting or leaching;
to form a hole of substantial uniform symmetry along its length in the article wall and to minimize the formation of burrs, recast layers, and other hole defects which lower the performance of the article.

7. An article comprising:
   a metal workpiece having an entrance surface for receiving impingement of beam energy capable of drilling a hole therein, and an exit surface;
   a backer placed in a gas tight contact with the exit surface of the workpiece, the backer consisting of:
      (a) particulates adapted to absorb beam energy and thereby become vaporized when impinged upon, and
      (b) a binder, intermixed with and intimately surrounding the particulates for adhering them to each other, the binder being vaporizable under action of the beam and being convertible to a liquid after drilling without deleterious effect on the workpiece;
   the backer being adapted to removal from the workpiece after drilling by conversion of the binder to a liquid; and
   the backer having sufficient combination of particulate, binder, and thickness to provide for beam absorption and for generation of sufficient gas to expel molten metal from a hole at the entrance surface.

8. The article of claim 7 wherein the particulates are nonmetallic powders, such as ceramics or glasses, and wherein the binder is an organic polymer convertible into a liquid at a temperature less than about 300° F. (150° C.).

9. The article of claim 7 wherein the backer is provided as a coating adhered to the exit surface by the binder.

10. The article of claims 7, 8 or 9 wherein the particulates are greater than 5 microns average particle size and comprise 50–90 percent by weight of the backer, and wherein the backer thickness is about 1.5 to 6 mm (0.06 to 0.25 inch).

11. The method of drilling a hole with an energy beam, such as an electron beam, through the first section of a workpiece having at least two spaced apart sections lying along the path of the beam, wherein the space between the sections is at least partially filled with a solid backer in intimate contact with the beam exit surface of the first section during hole dirlling, and wherein the backer is converted into at least a partial liquid state while it is being placed into and removed from the space.

12. The method of claim 11 wherein the workpiece is a tubular article and the first section is a wall of the article and the second section is an opposing wall.

* * * * *